(12) United States Patent
Zhuang et al.

(10) Patent No.: US 10,864,831 B2
(45) Date of Patent: Dec. 15, 2020

(54) MOTOR VEHICLE LATCH, IN PARTICULAR, BACKREST LATCH ON A MOTOR VEHICLE SEAT

(71) Applicant: Kiekert AG, Heiligenhaus (DE)

(72) Inventors: Jim Zhuang, Canton, MI (US); Scott Brown, Livonia, MI (US); Keith Robertson, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 35 days.

(21) Appl. No.: 16/245,305

(22) Filed: Jan. 11, 2019

(65) Prior Publication Data

US 2020/0223330 A1 Jul. 16, 2020

(51) Int. Cl.
*B60N 2/02* (2006.01)
*B60N 2/22* (2006.01)
*B60N 2/20* (2006.01)
*B60N 2/36* (2006.01)

(52) U.S. Cl.
CPC .......... *B60N 2/2245* (2013.01); *B60N 2/206* (2013.01); *B60N 2/366* (2013.01)

(58) Field of Classification Search
CPC .. E05B 85/26; E05B 85/00; E05B 2015/0431; E05B 77/36; Y10T 292/1047; Y10T 292/108; Y10S 292/62; Y10S 292/23
USPC ...... 297/378.13, 353, 336, 344.1; 296/65.03, 296/65.09, 65.16
See application file for complete search history.

(56) References Cited

U.S. PATENT DOCUMENTS

| | | | | |
|---|---|---|---|---|
| 8,827,329 B2* | 9/2014 | Scholz | .................... | E05B 85/26 |
| | | | | 292/216 |
| 9,212,509 B2* | 12/2015 | Pettengill | ................ | E05B 85/00 |
| 9,394,728 B2* | 7/2016 | Tomaszewski | ......... | E05B 77/26 |
| 9,617,761 B2 | 4/2017 | Scholz | | |
| 9,752,357 B2* | 9/2017 | Scholz | .................... | E05B 85/26 |
| 10,132,109 B2* | 11/2018 | Bendel | .................... | E05B 85/26 |
| 10,415,278 B2* | 9/2019 | Choi | ........................ | E05B 85/26 |
| 2005/0184549 A1* | 8/2005 | Robinson | ........... | B60N 2/01583 |
| | | | | 296/65.03 |
| 2010/0052336 A1* | 3/2010 | Bendel | .................... | E05B 85/26 |
| | | | | 292/196 |
| 2011/0012376 A1* | 1/2011 | Hunt | ....................... | E05B 85/26 |
| | | | | 292/216 |

(Continued)

FOREIGN PATENT DOCUMENTS

| | | | |
|---|---|---|---|
| WO | 01/47743 A1 | 7/2001 | |
| WO | 2017/009336 A1 | 1/2017 | |
| WO | 2017/195023 A1 | 11/2017 | |

OTHER PUBLICATIONS

International Search Report and Written Opinion dated Mar. 17, 2020 for International Patent Application No. PCT/IB2019/060752.

*Primary Examiner* — Chi Q Nguyen
(74) *Attorney, Agent, or Firm* — Renner, Otto, Boisselle & Sklar, LLP

(57) ABSTRACT

A motor vehicle latch, in particular, a backrest latch on a motor vehicle seat. This latch is fitted with a locking mechanism consisting essentially of a catch, of a comfort pawl that secures the catch, as well as a pawl that acts on the comfort pawl. The pawl and the catch are resiliently coupled with the aid of at least one spring. The pawl is fitted with a securing arm and an actuating arm spaced apart from the securing arm over a predefined rotation angle, in each case for the comfort pawl.

20 Claims, 3 Drawing Sheets

(56) References Cited

U.S. PATENT DOCUMENTS

| | | | |
|---|---|---|---|
| 2011/0068612 A1* | 3/2011 | Thiel | B60N 2/123 |
| | | | 297/344.1 |
| 2011/0169280 A1* | 7/2011 | Scholz | E05B 85/26 |
| | | | 292/200 |
| 2011/0169282 A1* | 7/2011 | Scholz | E05B 85/26 |
| | | | 292/220 |
| 2012/0068480 A1* | 3/2012 | Bendel | E05B 85/26 |
| | | | 292/220 |
| 2016/0108647 A1 | 4/2016 | Scholz | |
| 2018/0043801 A1 | 2/2018 | Lambertz | |

* cited by examiner

MOTOR VEHICLE LATCH, IN PARTICULAR, BACKREST LATCH ON A MOTOR VEHICLE SEAT

FIELD OF INVENTION

The invention relates to a motor vehicle latch, in particular, to a backrest latch on a motor vehicle seat, having a locking mechanism that includes a catch, a comfort pawl for securing the catch, as well as a pawl that acts on the convenience latch, wherein the pawl and the catch are resiliently coupled by means of at least one spring.

BACKGROUND

Motor vehicle locks of the design described above, in which a so-called multi-pawl locking mechanism is provided, are distinguished on the one hand by minimal actuating forces and on the other hand by a particularly quiet operation. This may be attributed to the fact that multi-pawl locking mechanisms having a comfort pawl and a pawl first of all require reduced actuating forces as compared to conventional motor vehicle latches that include a catch and a pawl. Namely to open such a multi-pawl locking mechanism, it is regularly only required to lift the comfort pawl that secures the catch from its engagement with the catch with the aid of the pawl. For this purpose, the pawl generally operates on a more or less long lever arm of the convenience latch, so that only minimal actuating forces are required. This results in a simple and quiet manual opening of such a motor vehicle latch. This also applies to the case in which a motorized opening actuator is used.

Furthermore, the quasi successive actuation initially of the pawl not engaged with the catch for swiveling the comfort pawl and the subsequent pivotal movement of the comfort pawl for releasing the catch is correspondent with the opening sounds previously observed in conventional locking mechanisms, in particular, a so-called "opening plop", no longer occurring, at least as pronounced as previously. An improved acoustics is therefore achieved.

Because of the advantages just described, such multi-pawl locking mechanisms and correspondingly fitted motor vehicle latches are also employed and, in particular, as backrest latches on a motor vehicle seat, as this is described in detail in the generic WO 01/47743 A1. In such motor vehicle seat latches, respectively, backrest latches, in particular, disturbing sounds frequently resulting from structure-born sound transmission and resonance amplification in the motor vehicle interior are perceived as particularly disturbing. Furthermore, motor vehicle latches implemented in conjunction with motor vehicle seats must be compactly designed, because the available installation space is limited, is typically defined in the upholstery material and, when designed on a large scale, reduces the level of convenience.

In the state of the art according to WO 01/47743 A1, the spring between the pawl and the catch ensures that the opening movement of the locking mechanism is supported. This is also intended to prevent any jamming. This has proven successful in principle. However, the known teaching operates overall in such a way that the pawl is fitted with a latch surface, which interacts with and/or abuts a segment on the convenience latch. In the state of the art, this interaction is ultimately maintained throughout all functional positions. This is disadvantageous, insofar as over long time periods, potential contamination, rust, etc. between the latch surface and the segment may result in an overall "choppy actuation"; in any case functional impairments are possible. The invention seeks to remedy this altogether.

SUMMARY OF INVENTION

The overall technical problem underlying the invention is to further develop a motor vehicle latch and, in particular, a backrest latch on a motor vehicle seat of the design described above and the functionality described, so that functional impairments resulting, for example, from contaminations and/or over long time periods practically no (longer) occur.

To solve this technical problem, a generic motor vehicle latch and, in particular, a backrest latch on a motor vehicle seat according to the invention is characterized in that the pawl includes a securing arm and an actuating arm spaced apart from the securing arm over a predefined rotation angle, in each case for the convenience latch.

The design of the locking mechanism implemented according to the invention consisting essentially of a catch, comfort pawl and pawl typically operates in such a way that the associated axes of the two latches and also of the catch overall form a triangle. Since the comfort pawl also secures the catch, whereas the pawl interacts merely with the comfort pawl and not with the catch, the design of the pawl with the securing arm and the actuating arm spaced apart from the securing arm over a predefined rotation angle in each case for the convenience latch, ensures overall that the catch is free of or is freed from both latches during an opening process of the locking mechanism. In this way, no interactions, in principle and by design, are able to occur between the latches on the one hand or between the latches and the catch on the other hand.

This is because the pawl with its actuating arm ensures during an opening process of the locking mechanism that the comfort pawl is lifted from its securing engagement with the catch. In contrast, the securing arm of the pawl spaced opposite the actuating arm ensures that the comfort pawl in the locked state of the locking mechanism is held in its position, in which the catch is secured. By resorting to arms, each of which is spaced apart from one another over a predefined rotation angle, the securing arm on the one hand and the actuating arm on the pawl on the other hand, the invention ensures that no other contours sliding along one another occur and potentially result in the previously described functional disruptions. Instead, the invention operates with the arms on the pawl deliberately spaced apart from one another, each of which acts practically only selectively on the comfort pawl as a result of their spacing relative to one another over the predefined rotation angle. Such an action is particularly functionally reliable and insensitive to dirt, possibly rust or also wear. This results in an enhanced functionality also and, in particular, over long time periods.

In one refinement of the invention, the comfort pawl is L-shaped, having a stop arm for the catch and a latch arm interacting with the actuating arm of the pawl. The stop arm for the catch in this case has a largely selective contact with the catch in the locked state of the locking mechanism. The same applies in cases in which the actuating arm on the pawl hits against the latch arm of the comfort pawl to open the locking mechanism, thus explaining the previously described special functional safety.

Moreover, the design is advantageously such that the stop arm of the comfort pawl largely spans an insertion opening of the catch in the locked state of the locking mechanism.

Because the comfort pawl in the locked state of the locking mechanism is also advantageously situated with its rotation axis in line with a carrier arm of the catch and, furthermore, the pawl in this position is arranged with its rotation axis in line with an impact arm of the catch, an overall particularly compact and stout structure of the locking mechanism and, consequently, of the motor vehicle latch is on the whole realized and implemented. As a result of this, a line connecting the rotation axes of the catch and of the pawl, for example, extends nearly vertically when the motor vehicle latch according to the invention is installed.

The pawl, in addition to the actuating arm and the securing arm, is also fitted with a spring arm. Connected to this spring arm is the spring, which resiliently couples the pawl to the catch. The other end of the spring in this case is advantageously connected to a spring extension of the catch.

The actuating arm and the securing arm on the pawl are situated generally at an obtuse angle relative to one another. As a result, a relatively large distance is observed between the actuating arm and the securing arm as seen over the rotation angle, because both arms between them form an obtuse angle, i.e., an angle that is formed larger than a right angle. As a result, a pivotal movement about a relatively large pivot angle is required in order with the aid of the pawl to lift the comfort pawl from its securing engagement in the catch in the locked state of the locking mechanism. In fact, pivot angles are observed, which may typically be greater than 30° and, in particular, 40° and greater.

In contrast, the spring arm is situated extending approximately in line with the actuating arm. As a result, the pawl, as viewed from above, has a T-shaped design or virtual T-shape. Not only is the spring according to an advantageous embodiment connected to the spring arm, but the spring arm is also utilized according to the invention to couple or connect an actuating means to the latter. The actuating means is usually a flexible actuating means, routinely a Bowden cable. The spring arm of the pawl and, consequently, the pawl as a whole, is acted upon with the aid of the actuating means.

The pawl is set in rotation as a result of this action. As a result, the securing arm of the pawl is pivoted away from the comfort pawl in the locked state of the locking mechanism on the one hand, and the actuating arm of the pawl hits against the latch arm of the convenience latch, so that the comfort pawl as a whole is lifted from its securing engagement with the catch and, as a result thereof, is able, assisted by the spring, to open the catch. A previously captured locking pin or a locking clamp is released. The comfort pawl swivels in this process, as does the pawl, in such a way that during the opening process, the opening catch is free of both latches. Only at the end of the opening process may the catch with its impact arm hit against the stop arm of the convenience latch. At that point, the spring is also relaxed, which assists the opening process by its pretensioning built up during the opening process in the locked state of the locking mechanism.

BRIEF DESCRIPTION OF DRAWINGS

The invention is explained in greater detail below with reference to a drawing illustrating merely one exemplary embodiment, in which.

DETAILED DESCRIPTION

Figure 1:
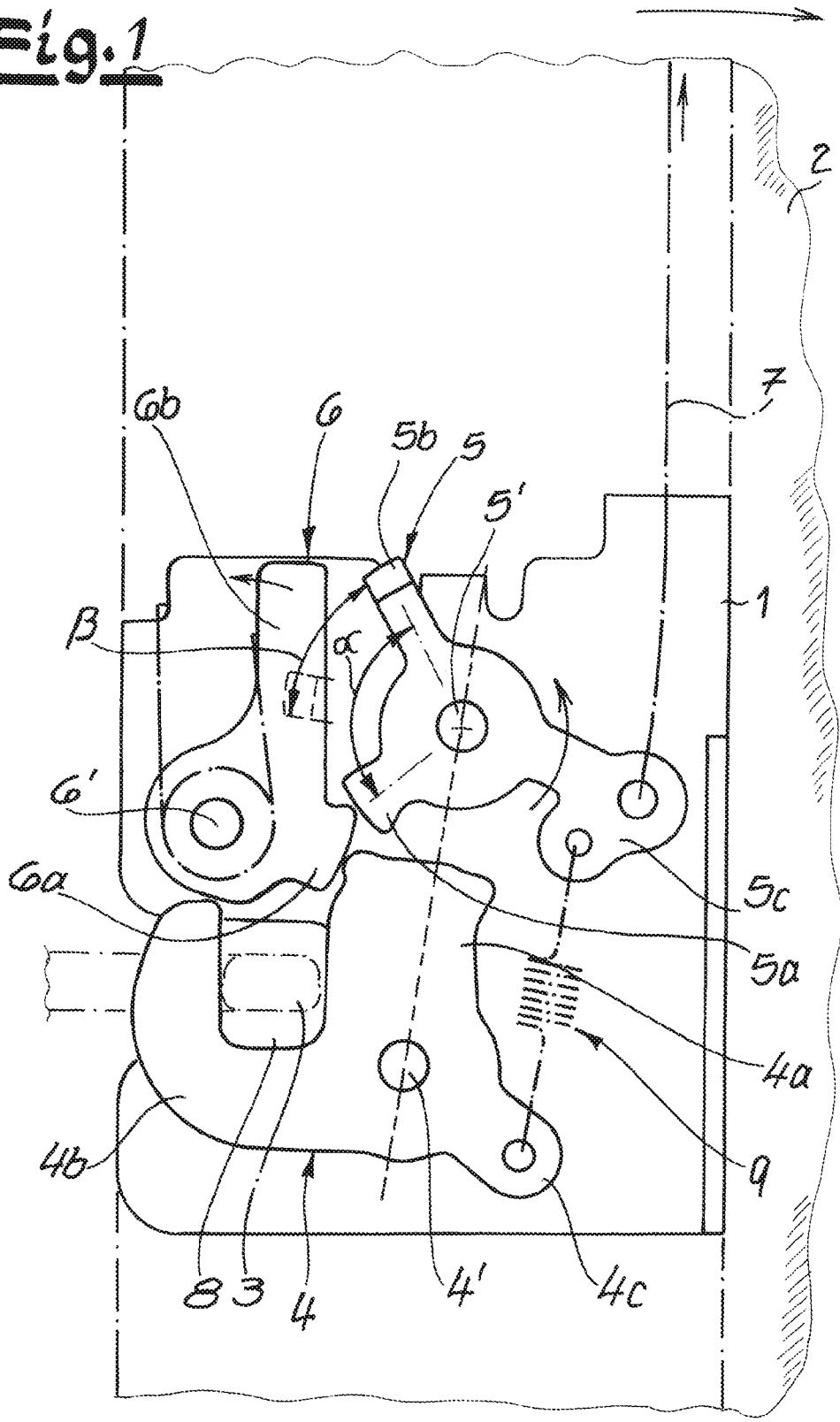
FIG. 1 shows the motor vehicle latch according to the invention in the locked state.

A motor vehicle latch, which is not strictly limited to a backrest latch on a motor vehicle seat, is illustrated in the figures. The motor vehicle latch includes a lock plate 1. The motor vehicle latch illustrated is set in a backrest 2 indicated merely in FIG. 1. The back rest 2 is part of a motor vehicle seat, usually a rear seat or a rear bench seat. The motor vehicle latch 1 in or on the backrest 2 interacts with a lock striker 3 affixed to the bodywork. In order to be able to fold the backrest 2 indicated in FIG. 1, for example, forward in the direction of the arrow onto a seating surface of the motor vehicle seat, it is necessary to open a locking mechanism 4, 5, 6.

For this purpose, the locking mechanism 4, 5, 6 is acted upon by an actuating means 7. The actuating means 7 is, according to the exemplary embodiment, a flexible actuating means 7, for example, a Bowden cable. The actuating means 7, the Bowden cable in the example, may be connected at its end to a release button or to another handle. It is possible, of course for the actuating means 7 to be acted upon by a motor.

In any case, a pulling action on the actuating means 7 indicated in FIG. 1 by an arrow causes the locking mechanism 4, 5, 6 to open, starting from the "locked" state illustrated in FIG. 1. As a result of this, the locking mechanism 4, 5, 6 releases the lock striker 3 and the backrest 2 may be folded in the direction indicated in the example by the arrow.

The locking mechanism 4, 5, 6 according to the exemplary embodiment is designed as a multi-pawl locking mechanism 4, 5, 6. In fact, the locking mechanism 4, 5, 6 includes a catch 4 and two latches 5, 6. In the "locked" position of the locking mechanism 4, 5, 6 illustrated in FIG. 1, a comfort pawl 6 ensures that the catch 4 is secured and is unable to swivel open counter-clockwise about its rotation axis 4'. The comfort pawl 6 in turn is secured or blocked with the aid of a pawl 5, so that in the "locked" state according to FIG. 1, the comfort pawl 6 does not relinquish its catch 4-securing position.

Figure 3:
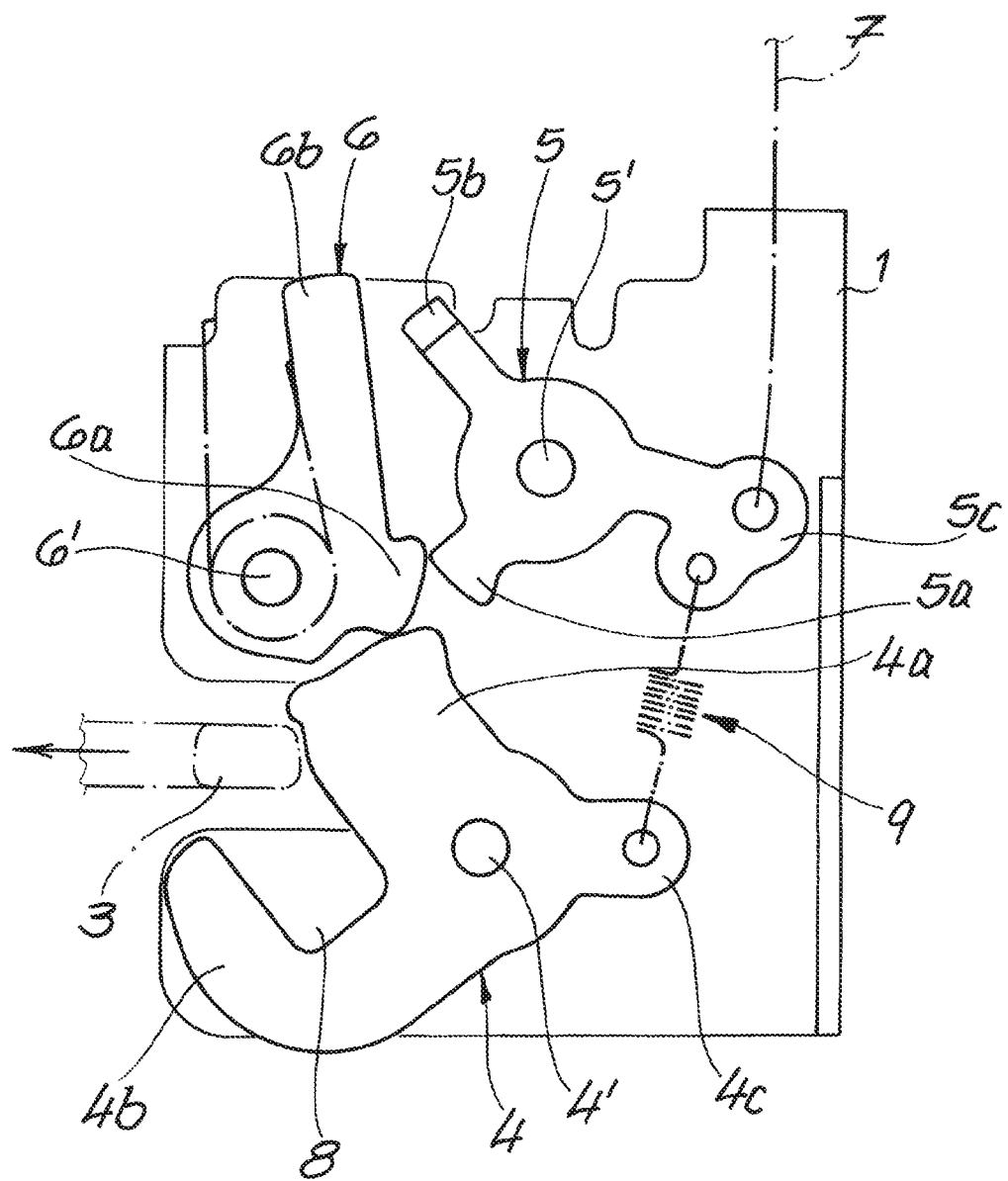
FIG. 3 shows the motor vehicle latch according to FIGS. 1 and 2 in the opened state.

The basic design also includes a spring 9 which resiliently couples the pawl 5 and the catch 4. At this point, multiple springs may in principle also be implemented. The spring 9 according to the exemplary embodiment is a coil spring, which is pre-tensioned in the "locked" state illustrated in FIG. 1. In contrast, the spring 9 in question assumes its relaxed position in the "opened" state of the locking mechanism 4, 5, 6 illustrated in FIG. 3.

The catch 4 has a rotation axis 4', with which it is rotatably mounted in the latch housing 1. The pawl 5 is also fitted with a rotation axis 5' for its mounting in the latch housing 1. The same applies to the comfort pawl 6, which has a corresponding rotation axis 6'. It is apparent that a line connecting the two rotation axes 4' and 5' or a corresponding connecting line extends nearly vertically or in the direction of the backrest 2. In addition, the three axes 4', 5', 6' collectively form a triangle.

According to the invention, the pawl 5 has a securing arm 5a, an actuating arm 5b and finally also a spring arm 5c which, however, is not essential to the functionality described below and may be considered optional. The arms 5a, 5b, 5c in this case are collectively oriented so that the pawl 5, as viewed from above, is nearly T-shaped.

It is apparent that the securing arm 5a and the actuating arm 5b are spaced apart from one another on the pawl 5 over a predefined rotation angle α. The angle α is an obtuse angle. According to the exemplary embodiment, the angle α assumes values between 90° and 100°. This is, of course, merely exemplary. This spacing of the securing arm 5a and of the actuating arm 5b results in merely selective contacts in each case during an opening process of the locking mechanism 4, 5, 6, as is explained in greater detail below.

Starting initially with the "locked" state according to FIG. 1, it becomes clear that the securing arm 5a of the pawl 5 abuts a stop arm 6a of the comfort pawl 6. At the same time, the stop arm 6a of the comfort pawl 6 also ensures that the catch 4 maintains its position 4. In fact, the catch 4 hits against the actuating arm 6a of the comfort pawl 6 with an edge of its impact arm 4a.

The comfort pawl 6 is on the whole L-shaped and, in addition to the previously described stop arm 6a for the catch 4, also includes a latch arm 6b, which interacts with the actuating arm 5b of the pawl 5. The stop arm 6a and the latch arm 6b of the comfort pawl 6 between them for an approximate right angle.

Based on FIG. 1 and on the "locked" state of the locking mechanism 4, 5, 6 illustrated there, it is apparent that in this position, the comfort pawl 6 with its stop arm 6a largely spans an insertion opening 8 of the catch 4. In fact, this insertion opening 8 is defined between the previously described impact arm 4a of the catch 4 on the one hand and an additional carrier arm 4b on the other hand. In the insertion opening 8, the lock striker 3 is received and held in the "locked" state according to FIG. 1.

FIG. 1 also makes it clear that in the "locked" state of the locking mechanism 4, 5, 6 illustrated there, the comfort pawl 6 with its rotation axis 6' is situated in line with the carrier arm 4b of the catch 4. This, and the previously described fact that, in addition, a line or connecting line passing through the axis 4' of the catch 4 and the axis 5' of the pawl extends nearly vertically, explains the fact that the motor vehicle latch according to the invention has a particularly compact and stout design. This means, the pawl 5 is situated in the locked state in question with its rotation axis 5' nearly vertically in line with the axis 4' of the catch 4, respectively, of the impact arm 4a of the catch 4.

As previously stated and explained, the pawl 5, in addition to the securing arm 5a and the actuating arm 5b, also has the previously mentioned spring arm 5c. Attached to the spring arm 5c is the spring 9. The spring 9 also experiences a connection to a spring extension 4c of the catch 4. Since the rotation axis 5' of the pawl 5 is situated approximately in line with the axis or rotation axis 4' of the catch 4 and of the impact arm 4a of the catch 4, the spring extension 4c of the catch 4 on the one hand, and the spring arm 5c of the pawl 5 on the other hand may extend beyond this connecting line, which is imaginary and indicated merely by dashed lines in FIG. 1. As a consequence of this, the spring 9 also has a predominantly vertical alignment. The spring arm 5c in this case is oriented approximately in line with the actuating arm 5b.

The functionality is as follows. Starting from the "locked" state according to FIG. 1, an opening process of the locking mechanism 4, 5, 6 is correspondent with the pawl 5 being acted upon in a pulling manner with the aid of the actuating means 7, as this is indicated by the arrow in FIG. 1. As a result, the pawl 5 performs a counter-clockwise movement about its axis 5', as is indicated in FIG. 1. Also plotted here is the overall completed pivot angle ß. This pivot angle may be located in the area of approximately 50° which, of course, is merely exemplary. The result of this is that when transitioning from FIG. 1 to FIG. 2, the securing arm 5a of the pawl 5 leaves the stop arm 6a of the comfort pawl 6.

Figure 2:
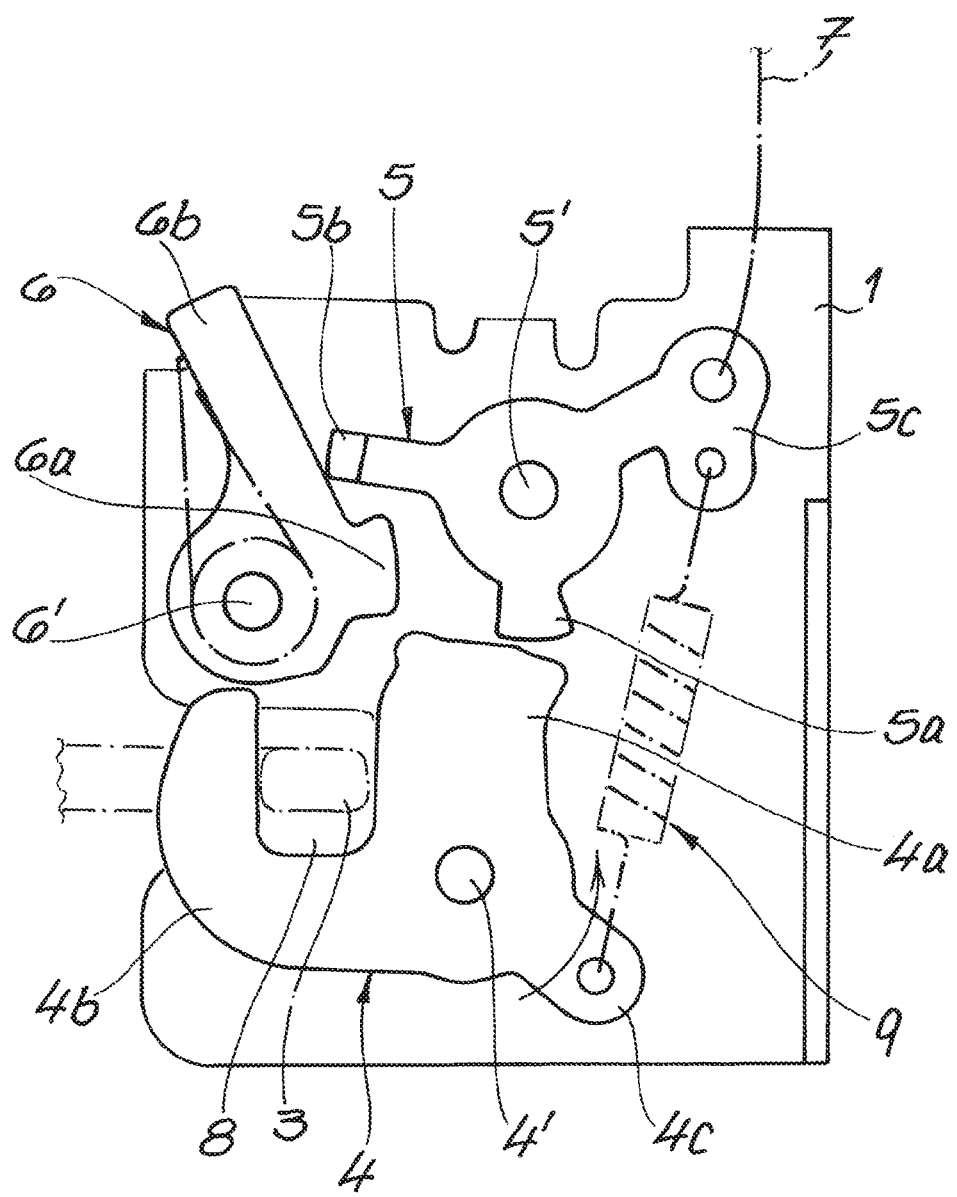
FIG. 2 shows an opening process of the motor vehicle latch according to FIG. 1.

Since the actuating arm 5b also hits against the comfort pawl 6, respectively its latch arm 6b during the opening process of the pawl 5 and the associated counter-clockwise movement about its axis 5', the comfort pawl 6, when transitioning from FIG. 1 to FIG. 2, is swiveled counter-clockwise about its axis 6'. As a result, the stop arm 6a of the comfort pawl 6 is on the whole freed from the catch 4. This is because the impact arm 4a of the catch 4 is no (longer) secured by the stop arm 6a of the comfort pawl 6.

The catch 4 is now free and may now proceed in the opening direction, starting from the position illustrated in FIG. 2, i.e., it performs a counter-clockwise movement about its axis 4'. As a result, the lock striker 3 previously held in the insertion opening 8 is freed from the catch 4. This becomes clear when transitioning to FIG. 3.

The lock striker 3 is now free of the catch 4 and the catch 4 has opened further. This opening process is assisted by the spring 9 which, starting from its lightly tensioned position in the "locked" state of the locking mechanism 4, 5, 6 in FIG. 1, is further tensioned during the further opening process, and in this way assists overall the counter-clockwise movement of the catch 4 during the opening process, for example, in FIG. 2. The spring 9 has relaxed in the functional position according to FIG. 3. In addition, the catch 4 with its impact arm 4a—again—abuts the stop arm 6a of the comfort pawl 6. As a result, the opening movement of the catch is limited. The lock striker 3 is freed, so that the backrest 2 may be swiveled in the direction of the arrow illustrated in FIG. 1.

LIST OF REFERENCE NUMERALS 1 lock plate
2 backrest
3 lock striker
4 catch
4' rotation axis
4a impact arm
4b carrier arm
4c spring extension
5 pawl
5' rotation axis
5a securing arm
5b actuating arm
5c spring arm
6 convenience latch
6' rotation axis
6a stop arm
6b latch arm
7 actuating means, spring
8 insertion opening
9 spring
α rotation angle
ß pivot angle

The invention claimed is:
1. A motor vehicle latch comprising:
a locking mechanism having a catch, a comfort pawl that secures the catch, and a pawl that acts on the comfort pawl, the locking mechanism movable between a locked state and an opened state,
wherein the pawl and the catch are resiliently coupled by a spring directly coupled to each of the pawl and the catch, wherein the pawl includes a securing arm and an actuating arm spaced apart from the securing arm over a predefined rotation angle, and wherein each of the securing arm and the actuating arm is directly engageable with the comfort pawl, the securing arm engaging the comfort pawl to hold the comfort pawl in a position in which the catch is in a closed position during the locked state of the locking mechanism, the actuating arm engaging the comfort pawl to lift the comfort pawl from the catch during the opened state of the locking mechanism.

2. The motor vehicle latch according to claim 1, wherein the comfort pawl is L-shaped, having a stop arm for the catch and a latch arm that interacts with the actuating arm of the pawl.

3. The motor vehicle latch according to claim 2, wherein during the locked state of the locking mechanism, the stop arm spans an insertion opening of the catch.

4. The motor vehicle latch according to claim 3, wherein the insertion opening is defined between an impact arm of the catch and a carrier arm of the catch.

5. The motor vehicle latch according to claim 4, wherein the insertion opening is configured to receive a lock striker when the locking mechanism is in the locked state.

6. The motor vehicle latch according to claim 2, wherein the stop arm and the latch arm form a right angle therebetween.

7. The motor vehicle latch according to claim 2, wherein the catch is disengaged from the pawl and the comfort pawl when the locking mechanism moves from the locked state to the opened state, wherein the catch abuts against the stop arm of the comfort pawl when the locking mechanism reaches the opened state.

8. The motor vehicle latch according to claim 7, wherein the catch is moved by the spring when the catch is disengaged from the pawl and the comfort pawl.

9. The motor vehicle latch according to claim 1, wherein during the locked state of the locking mechanism, a rotation axis of the comfort pawl is in line with a carrier arm of the catch.

10. The motor vehicle latch according to claim 1, wherein during the locked state of the locking mechanism, a rotation axis of the pawl is in line with an impact arm of the catch.

11. The motor vehicle latch according claim 1, wherein the pawl includes a spring arm.

12. The motor vehicle latch according to claim 11, wherein the spring arm of the pawl extends in line with the actuating arm.

13. The motor vehicle latch according to claim 11, wherein the spring and an actuator are connected to the spring arm of the pawl.

14. The motor vehicle latch according to claim 1, wherein the securing arm and the actuating arm are situated at an obtuse angle relative to one another.

15. The motor vehicle latch according to claim 14, wherein the obtuse angle is between 90° and 100°.

16. The motor vehicle latch according to claim 1, wherein the catch includes a spring extension for connecting to the spring.

17. The motor vehicle latch according to claim 1, wherein a rotation axis of the pawl, a rotation axis of the catch, and a rotation axis of the comfort pawl together form a triangle.

18. The motor vehicle latch according to claim 1, wherein the pawl includes a spring arm, wherein the pawl is T-shaped, with the securing arm forming a base of the T-shaped pawl, and the actuating arm and the spring arm forming arms relative to the base.

19. A backrest in a motor vehicle seat, the backrest comprising the motor vehicle latch according to claim 1.

20. The motor vehicle latch according to claim 1, wherein the spring is pre-tensioned to bias the locking mechanism in the locked state, and wherein the spring is in a relaxed position when the locking mechanism is in the opened state.

* * * * *